(12) United States Patent
Axelrod et al.

(10) Patent No.: US 10,644,548 B1
(45) Date of Patent: May 5, 2020

(54) SCANNING MOTOR WITH BUILT-IN MAGNETIC STIFFNESS

(71) Applicant: APPLE INC., Cupertino, CA (US)

(72) Inventors: Noel Axelrod, Jerusalem (IL); Rashed Mahameed, Um Al-Fahm (IL); Raviv Erlich, Kibbutz Beit Nir (IL); Yuval Gerson, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 214 days.

(21) Appl. No.: 15/807,605

(22) Filed: Nov. 9, 2017

Related U.S. Application Data

(60) Provisional application No. 62/467,149, filed on Mar. 5, 2017, provisional application No. 62/503,966, filed on May 10, 2017.

(51) Int. Cl.
| | | |
|---|---|---|
| *G02B 26/08* | (2006.01) | |
| *H02K 1/17* | (2006.01) | |
| *H02K 1/34* | (2006.01) | |
| *H02K 1/27* | (2006.01) | |
| *H02P 25/032* | (2016.01) | |
| *H02K 7/14* | (2006.01) | |
| *H02K 1/14* | (2006.01) | |

(52) U.S. Cl.
CPC ........... *H02K 1/17* (2013.01); *G02B 26/0816* (2013.01); *H02K 1/14* (2013.01); *H02K 1/27* (2013.01); *H02K 1/34* (2013.01); *H02K 7/14* (2013.01); *H02P 25/032* (2016.02)

(58) Field of Classification Search
CPC .. H02K 1/17; H02K 1/14; H02K 1/27; H02K 7/14; H02K 1/34; H02P 25/032; G02B 26/0816

USPC ....................................................... 359/221.3
See application file for complete search history.

(56) References Cited

U.S. PATENT DOCUMENTS

| | | | |
|---|---|---|---|
| 3,959,673 | A | 5/1976 | Montagu |
| 6,265,794 | B1 | 7/2001 | DeBoalt |
| 9,063,549 | B1 | 6/2015 | Pennecot et al. |
| 9,835,853 | B1 * | 12/2017 | Shpunt ................. G02B 26/105 |
| 10,498,180 | B2 | 12/2019 | Liang |
| 2002/0163701 | A1 | 11/2002 | Plesko |

(Continued)

FOREIGN PATENT DOCUMENTS

| | | |
|---|---|---|
| EP | 0671698 A2 | 9/1995 |
| JP | 10201285 A | 7/1998 |
| WO | 2014016794 A1 | 1/2014 |

OTHER PUBLICATIONS

Shpunt et al., U.S. Appl. No. 15/826,732, filed Nov. 30, 2017.
U.S. Appl. No. 15/826,732 office action dated Mar. 20, 2020.

*Primary Examiner* — Euncha P Cherry
(74) *Attorney, Agent, or Firm* — Kligler & Associates Patent Attorneys Ltd

(57) ABSTRACT

Scanning apparatus includes a rotor, including a permanent magnet, which is configured to rotate about an axis. A stator includes a magnetic core, which is configured to generate a static magnetic field in a vicinity of the rotor and defines an equilibrium angle of rotation of the rotor, at which the permanent magnet is aligned with the static component of the magnetic field. At least one coil is wound on the magnetic core so that when the coil driven with an AC electrical current at a selected frequency, the stator generate a time-alternating magnetic field, which causes the rotor to oscillate on the axis at the selected frequency about the equilibrium angle.

20 Claims, 6 Drawing Sheets

(56) References Cited

U.S. PATENT DOCUMENTS

2013/0207970 A1    8/2013   Shpunt et al.
2014/0204431 A1*   7/2014   Tsuchiya .............. G02B 26/122
                                                                                 358/474

* cited by examiner

SCANNING MOTOR WITH BUILT-IN MAGNETIC STIFFNESS

CROSS-REFERENCE TO RELATED APPLICATION

This application claims the benefit of U.S. Provisional Patent Application 62/467,149, filed Mar. 5, 2017, and U.S. Provisional Patent Application 62/503,966, filed May 10, 2017, which are incorporated herein by reference.

FIELD OF THE INVENTION

The present invention relates generally to electromagnetic actuators, and particularly to methods and devices for controlling the operation of a resonant magnetic scanning motor.

BACKGROUND

Various means are known in the art for driving a scanning mirror. For example, PCT International Publication WO 2014/016794, whose disclosure is incorporated herein by reference, describes a dual-axis scanning mirror with a magnetic drive. The drive includes a stator assembly, which includes a core containing an air gap and one or more coils including conductive wire wound on the core so as to cause the core to form a magnetic circuit through the air gap in response to an electrical current flowing in the conductive wire. A scanning mirror assembly includes a support structure, a base, which is mounted to rotate about a first axis relative to the support structure, and a mirror, which is mounted to rotate about a second axis relative to the base. At least one rotor includes one or more permanent magnets, which are fixed to the scanning mirror assembly and which are positioned in the air gap so as to move in response to the magnetic circuit. A driver is coupled to generate the electrical current in the one or more coils.

SUMMARY

Embodiments of the present invention that are described hereinbelow provide resonant scanning motors with enhanced performance.

There is therefore provided, in accordance with an embodiment of the invention, scanning apparatus, which includes a rotor including a permanent magnet, which is configured to rotate about an axis. A stator includes a magnetic core, which is configured to generate a static magnetic field in a vicinity of the rotor and defines an equilibrium angle of rotation of the rotor, at which the permanent magnet is aligned with the static component of the magnetic field. At least one coil is wound on the magnetic core so that when the coil driven with an AC electrical current at a selected frequency, the stator generate a time-alternating magnetic field, which causes the rotor to oscillate on the axis at the selected frequency about the equilibrium angle.

In a disclosed embodiment, the rotor has a resonant frequency of oscillation that is determined by a strength of the static magnetic field, and the apparatus includes a drive circuit, which is coupled to drive the at least one coil at the resonant frequency.

In some embodiments, the magnetic core includes one or more further permanent magnets, which are positioned so as to generate the static magnetic field. In the disclosed embodiments, the permanent magnets of the rotor and magnetic core have magnetic moments that are aligned at the equilibrium angle of rotation. Additionally or alternatively, the one or more permanent magnets of the magnetic core are positioned along the equilibrium angle with respect to the rotor.

In other embodiments, the rotor has a shape that is asymmetrical about the axis, and the equilibrium angle is determined by the asymmetrical shape of the rotor.

In some embodiments, the magnetic core includes pole pieces on which the at least one coil is wound, wherein the pole pieces are disposed adjacent to the rotor on opposing sides of the equilibrium angle.

Additionally or alternatively, the magnetic core includes one or more pole pieces, on which the at least one coil is wound and which are disposed adjacent to the rotor, and a frame, which includes a ferromagnetic material and surrounds the one or more pole pieces, the at least one coil, and the rotor.

In some embodiment, the apparatus includes a shaft, which is fixed to the rotor, and a mirror, which is fixed to the shaft so that the mirror oscillates with the rotor. In one embodiment, the apparatus includes a torsion spring, extending along the axis and having a first end that is attached to rotate with the shaft and a second end attached to a base of the apparatus.

There is also provided, in accordance with an embodiment of the invention, a method for scanning, which includes mounting a rotor including a permanent magnet, to rotate about an axis within a stator, including a magnetic core, which generates a static magnetic field in a vicinity of the rotor and defines an equilibrium angle of rotation of the rotor, at which the permanent magnet is aligned with the static component of the magnetic field. At least one coil, which is wound on the magnetic core, is driven with an AC electrical current at a selected frequency, whereby the stator generates a time-alternating magnetic field, which causes the rotor to oscillate on the axis at the selected frequency about the equilibrium angle.

The present invention will be more fully understood from the following detailed description of the embodiments thereof, taken together with the drawings in which:

DETAILED DESCRIPTION OF EMBODIMENTS

Figure 1:
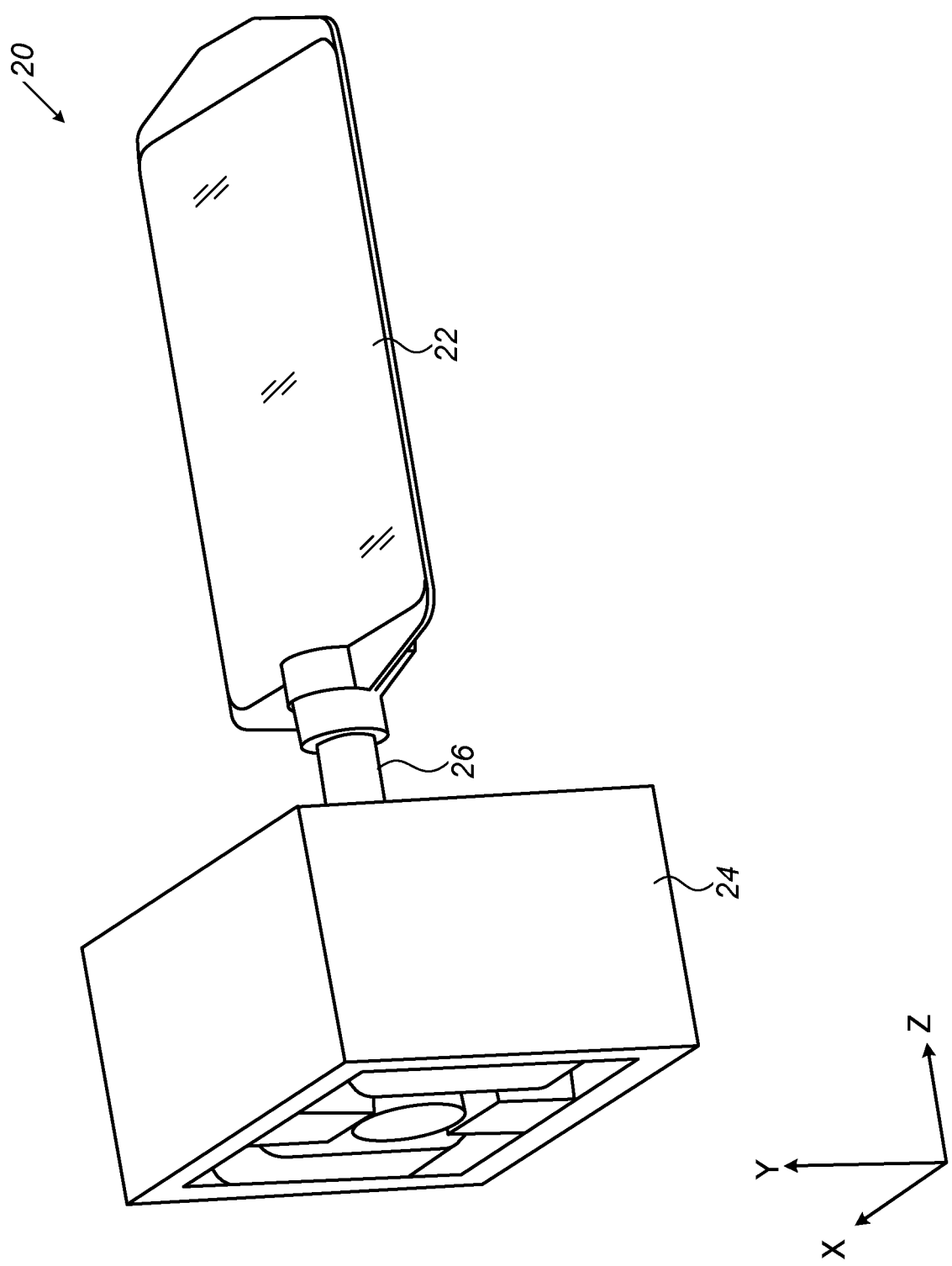
FIG. 1 is a schematic pictorial illustration of a resonant scanning mirror assembly, in accordance with an embodiment of the invention.

In some optical scanners that are based on a rotating mirror, such as those described above in the Background section, the mirror is driven to oscillate about its axis of rotation at a resonant frequency. This sort of resonant drive is advantageous in reducing power consumption and enhancing mechanical robustness of the scanner. Generally speaking, the resonant frequency $f_{res}$ is determined by the moment of inertia of the mirror I and the torsional stiffness k of the scanner about the axis of rotation:

$$f = \frac{1}{2\pi}\sqrt{\frac{k}{I}}$$

Increasing the stiffness k of the scanner will increase the resonant frequency, and hence facilitate faster scanning. Practically speaking, however, such an increase in mechanical stiffness often necessitates an increase in mass and size of the mechanical spring elements, and may result in increased size of the scanner, and thus, increased moment of inertia, which reduces the resonance frequency. In addition, the increased stiffness may result in increase of rotational damping and thus increased power consumption.

Embodiments of the present invention that are described herein address these difficulties by applying a novel magnetic "spring" to increase the torsional stiffness of a scanner. This arrangement increases the resonant frequency, with minimal cost in terms of size, mass and damping. The disclosed embodiments are useful particularly in driving optical scanning mirrors, but the principles of the present invention can alternatively be applied in producing compact, reliable mechanical oscillators for other purposes.

In the disclosed embodiments, a scanning motor comprises a rotor comprising a permanent magnet, which is mounted to rotate about an axis. For optical scanning, for example, a mirror may be fixed to a shaft, which is fixed to the rotor so that the mirror oscillates with the rotor about the axis. A stator, comprising a magnetic core, generates a magnetic field in the vicinity of the rotor with both static (DC) and time-alternating (AC) components. The static magnetic field defines an equilibrium angle of rotation of the rotor, at which the permanent magnet of the rotor is aligned with the static field. At least one coil is wound on the magnetic core and is driven with an AC electrical current at a selected frequency to generate the time-alternating magnetic field, which causes the rotor to oscillate on its axis at the selected frequency about the equilibrium angle.

The strength of the interaction between the static magnetic field of the stator and the rotor (which comprises a rotating permanent magnet, as explained above) determines the stiffness k of the magnetic spring action that returns the rotor to its equilibrium position, and thus can be used to set the resonant frequency of oscillation $f_{res}$. Typically (although not necessarily), the AC drive frequency of the coil is set to the resonant frequency of oscillation, which in turn is determined by the strength of the static magnetic field.

In some embodiments, the magnetic core of the stator comprises one or more dedicated permanent magnets, which are positioned so as to generate the desired static magnetic field. The permanent magnet or magnets of the magnetic core can be positioned along the equilibrium angle with respect to the rotor, and configured so that their magnetic moments are aligned with the magnetic moment of the rotor when the rotor is at the equilibrium angle of rotation.

Alternatively or additionally, the shape of the rotor may be asymmetrical about the axis of rotation, in such a way that the equilibrium angle is determined by the asymmetrical shape of the rotor.

In some embodiments, the magnetic core comprises pole pieces, adjacent to the rotor, on which the coil or coils are wound. The pole pieces may conveniently be disposed on opposing sides of the equilibrium angle. In one of the disclosed embodiments, the core comprises a ferromagnetic frame surrounding the other components of the scanning motor (including the pole pieces, coils and rotor). This closed-loop configuration reduces the stray magnetic field that "escapes" the confines of the core, thus increasing the stiffness of the magnetic spring (by at least a factor of two in comparison to the open core configuration) and enhancing the energy efficiency of the scanner.

FIG. 1 is a schematic pictorial illustration of a resonant scanning mirror assembly 20, in accordance with an embodiment of the invention. (In the present description, such scanning assemblies are also referred to, for the sake of brevity, simply as "scanners.") In assembly 20, a mirror 22 is mounted on a shaft 26, which is in turn fixed to the rotor of a scanning motor 24, whose design and operation are described in detail with reference to the figures that follow. The mirror rotates about the Z-axis (which is taken, for the sake of convenience, to be the longitudinal axis of the rotor of the scanning motor), in resonant oscillation about an equilibrium angle that is determined by the internal magnetic structure of the scanning motor. The rotor has a fixed magnetic polarization, and hence a magnetic moment $\hat{\mu}$, which is perpendicular to the longitudinal axis of the rotor. The equilibrium angle is taken to be the angle at which the magnetic moment of the rotor points along the Y-axis.

Figure 2A:
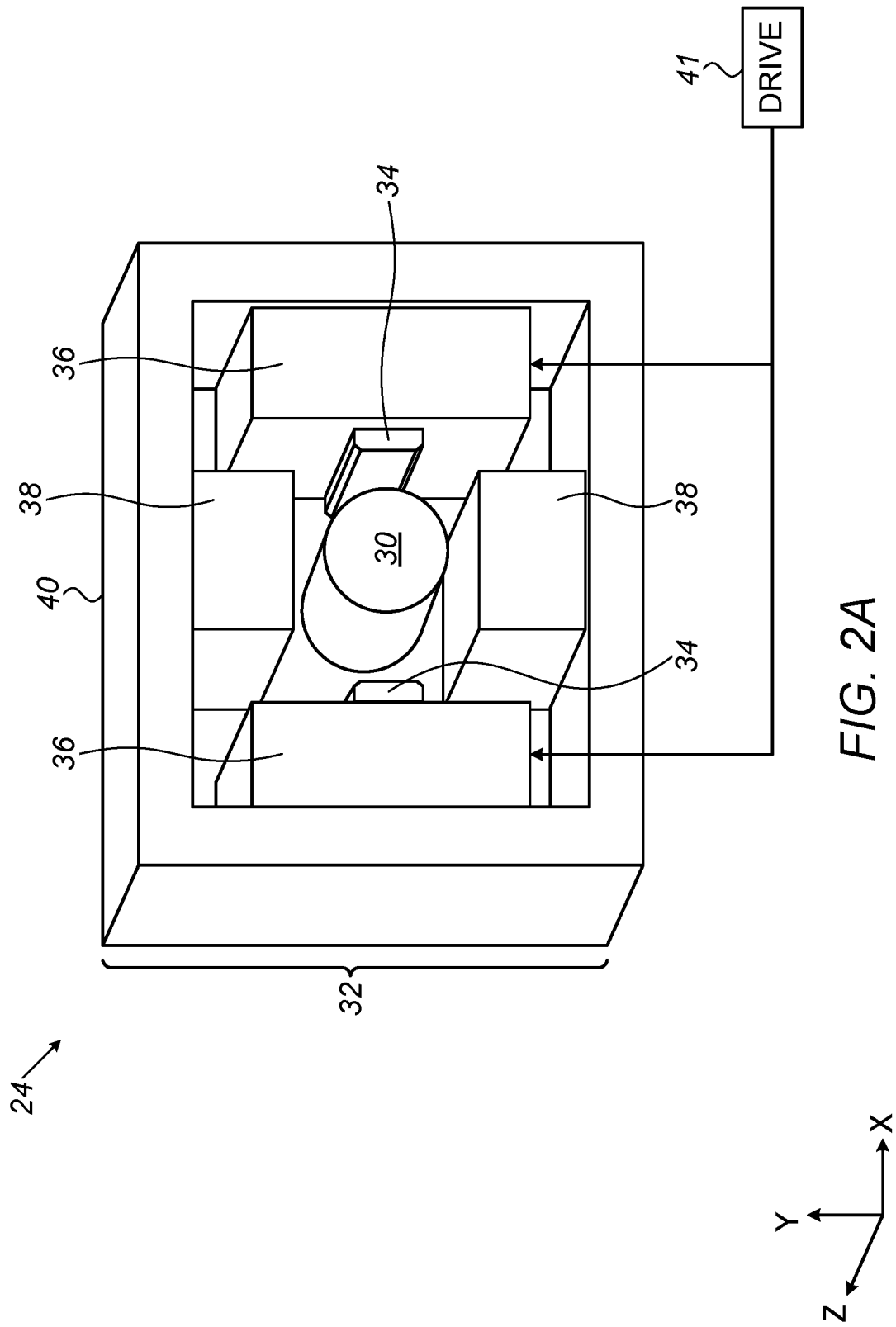
FIG. 2A is a schematic pictorial illustration of a magnetic scanning motor, in accordance with an embodiment of the invention.
Figure 2C:
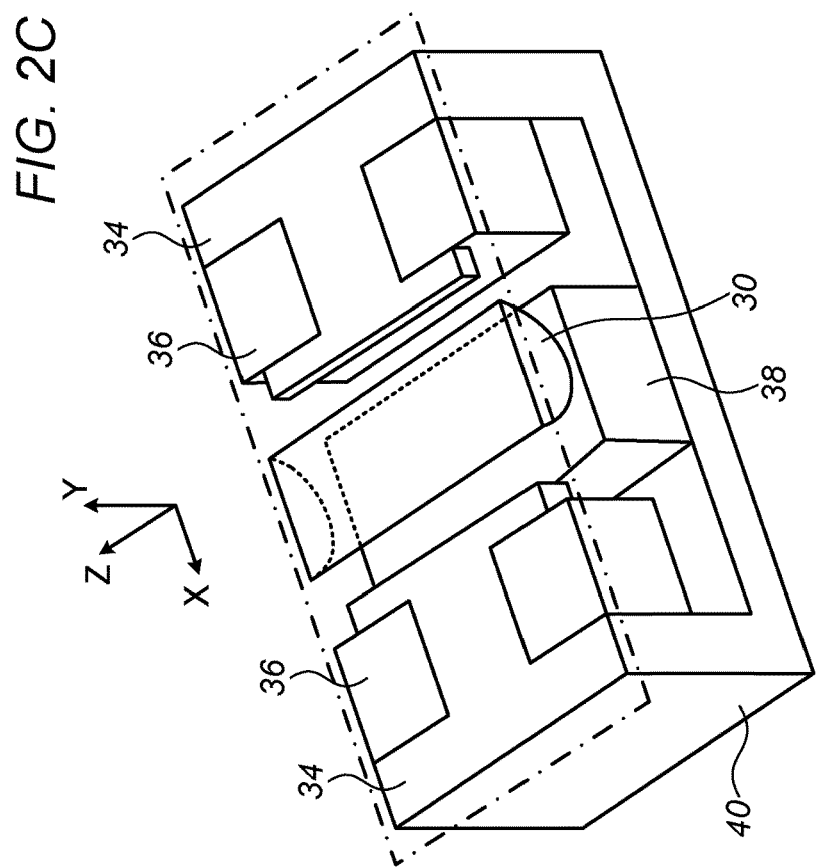
FIGS. 2B and 2C are schematic sectional views of the scanning motor of FIG. 2A.
Figure 2B:
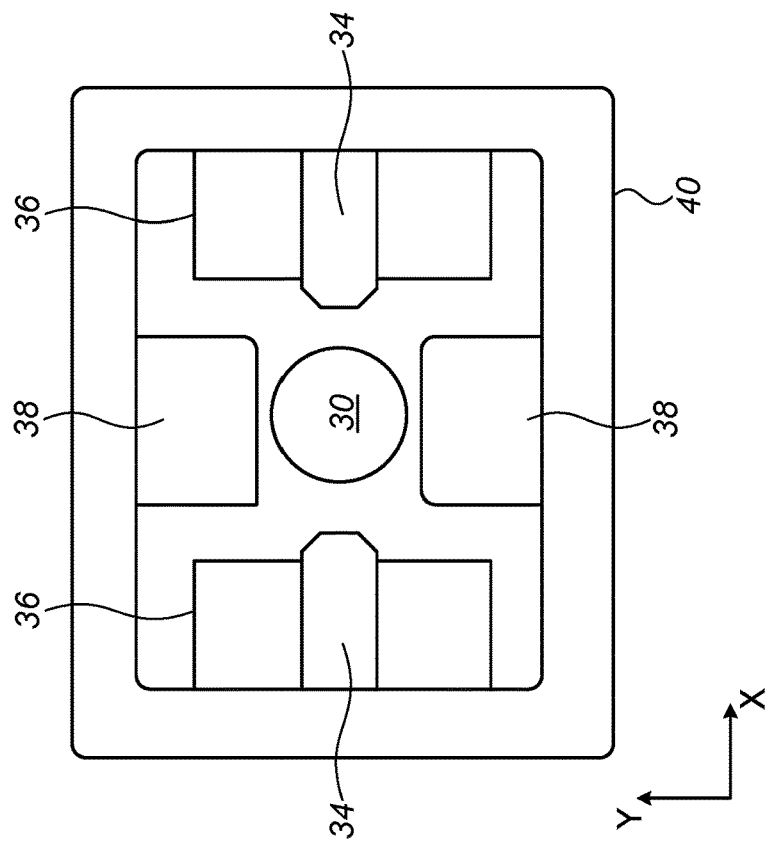

Reference is now made to FIGS. 2A-2C, which schematically show details of magnetic scanning motor 24, in accordance with an embodiment of the invention. FIG. 2A is a pictorial illustration of the scanning motor, while FIGS. 2B and 2C are sectional views in X-Y and X-Z planes, respectively. Motor 24 comprises a stator 32, which comprises a core 40 made of a suitable ferromagnetic material, such as low carbon steels (50H70 or 1010, for example) or Somaloy®. A rotor 30, comprising a suitable permanent magnetic material, such as NbFeB, is mounted to rotate about the Z-axis at the center of core 40. Typically, rotor 30 (or a shaft connected to the rotor) is mounted in suitable rotational bearings, as are known in the art. This mounting arrangement is omitted from FIGS. 2A-2C for the sake of simplicity, but an arrangement of this sort is shown, for example, in FIG. 3.

Core 40 is shaped to define an external frame containing a pair of pole pieces 34, which are disposed along the X-axis on opposing sides of rotor 30. Pole pieces 34 are wound with respective wire coils 36. A drive circuit 41 drives an AC current through coils 36 in order to generate a magnetic field along the X-axis at the desired oscillation frequency of the scanner. The interaction between this time-varying magnetic field and the fixed magnetic moment of rotor 30 causes the rotor to oscillate about the Z-axis at the drive frequency, which for efficient operation is typically (although not necessarily) set to be equal or close to the resonant frequency of oscillation of the rotor.

To control the stiffness of the scanner, and hence the resonant frequency, stator 32 in this embodiment also comprises two static permanent magnets 38 (which may similarly comprise NbFeB), positioned on opposing sides of rotor 30 along the Y-axis. The magnetic moments of magnets 38 are aligned along the Y-axis, so that the magnets generate a static magnetic field $\vec{B}$ in the vicinity of rotor 30 that is likewise directed along the Y-axis. Thus, at the equilibrium angle of rotor 30, the magnetic moment of rotor 30 is aligned with the static magnetic field of magnets 38, and the net static magnetic force exerted on the rotor is zero.

As rotor 30 rotates away from the equilibrium position, the interaction of the rotor and stator magnets 38 will exert a torque on the rotor given by $\hat{\tau}=\hat{\mu}\times\hat{B}$, so that the magnitude of the torque grows with rotation angle away from the equilibrium angle as τ=μB cos (θ), wherein $$\theta = \frac{\pi}{2} - \alpha,$$

and α is the angle between the vectors $\hat{\mu}$ and $\hat{B}$. In other words, the scanner behaves as though the rotor was held in its equilibrium position by a spring with a stiffness determined by the strength of the static magnetic interaction μB. Thus, the resonant frequency of the scanner can be set by appropriate choice of the permanent magnets and their geometry.

At zero drive current, the net static magnetic force on rotor 30 is zero at the equilibrium angle. In an example embodiment, the magnetic torque on rotor 30 (at zero drive current) increases to about 18,000 μN*m at 20 degrees of rotation. In this example, the stiffness k of the magnetic "spring" is approximately 53,000 μN*m/rad, and the resonant frequency of the scanner will be about 420 Hz.

The external frame portion of core 40 effectively contains the magnetic fields generated by both permanent magnets 38 and pole pieces 34, thus limiting the leakage of the lines of flux of the magnetic field outside the confines of the frame. Consequently, both the static and AC components of the magnetic field at rotor 30 are strengthened, by comparison with the amplitudes that would be achieved using similar permanent magnets and currents in the absence of the frame, and the scanner is therefore both stiffer and more efficient than would otherwise be possible. The above-mentioned US Provisional Patent Application 62/503,966 includes plots of torque and magnetic field computed for the scanning motor 24 that is shown in FIGS. 2A-C.

Figure 3:
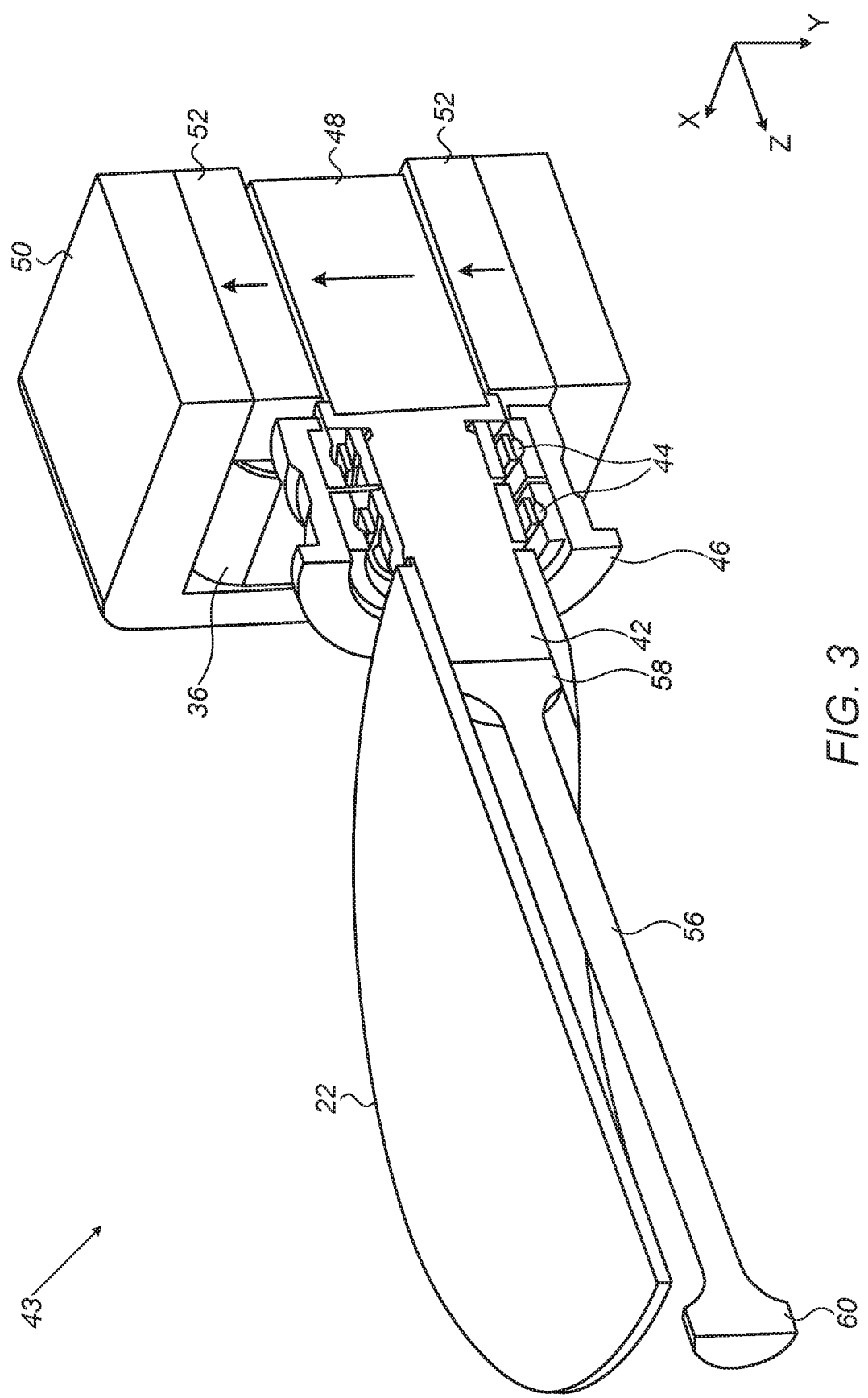
FIG. 3 is a schematic sectional view of a resonant scanning mirror assembly, in accordance with another embodiment of the invention.

FIG. 3 is a schematic sectional view of a resonant scanning mirror assembly 43, in accordance with another embodiment of the invention. Mirror 22 in this embodiment is fixed to a shaft 42, which rotates in rotational bearings 44, which are contained in a stationary collar 46 that is a part of the base (not shown) of assembly 32. Mirror 30 and shaft 42 thus rotate together about the shaft axis, which is again taken to be the Z-axis. A rotor 48, comprising a permanent magnet, is fixed to shaft 42, and rotates (along with shaft 42 and mirror 22) within a stator 50. The magnetic moment of rotor 48 is indicated in the figure by a vertical arrow.

Stator 50 likewise comprises permanent magnets 52, which generate the static component of the magnetic field that is exerted by the stator in the vicinity of rotor 48. Here, too, the magnetic moments of magnets 52 are oriented in the Y-direction, and thus define the equilibrium angle of rotation of shaft 42 at which the permanent magnet of rotor 48 is aligned with magnets 52.

In this embodiment, in addition to this magnetic spring force, a torsion spring 56 is connected between shaft 42 and the base of mirror assembly 32 in order to exert a mechanical torque that increases with the rotation of the shaft away from the equilibrium angle. For this purpose, an inner end 58 of torsion spring 56 is attached to shaft 42, while an outer end 60 is attached to the base of assembly 32. (Although torsion spring 56 is shown in FIG. 3, for the sake of visual clarity, as being distinct from shaft 42, in practice the torsion spring may be an integral part of the shaft, and the term "attached" in this context should be understood to include this sort of integral attachment.) The stiffness of torsion spring 56 and the magnetic spring force exerted by magnets 52 on rotor 48 together determine the overall torsional stiffness k, and hence the resonant frequency of oscillation of mirror 22.

Figure 4:
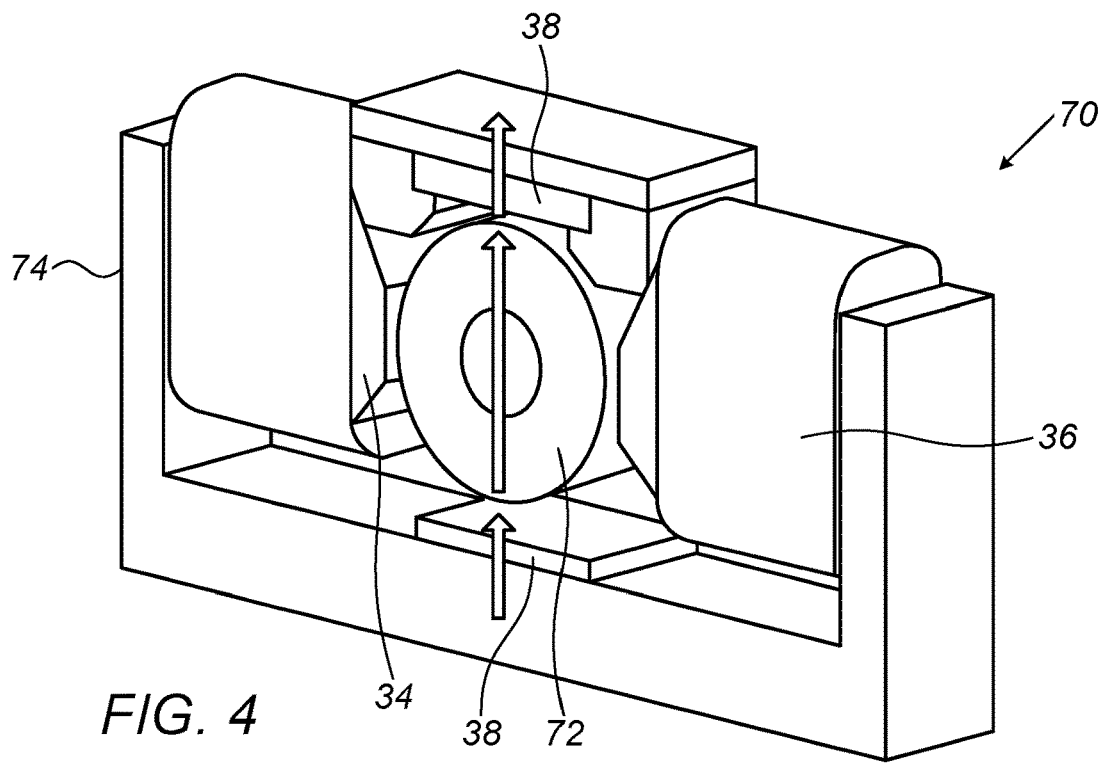
FIGS. 4-7 are schematic pictorial illustrations of magnetic scanning motors, in accordance with further embodiments of the invention.

FIG. 4 is a schematic pictorial illustration of a magnetic scanning motor 70, in accordance with a further embodiment of the invention. Motor 70 comprises a rotor 72 and a stator 74, which operate on principles similar to those of the motor of FIG. 2A. In the present embodiment, however, the core of stator 74 does not comprise a frame that completely surrounds the other elements of the motor. This design may thus offer smaller size and weight, though possibly at the expense of reduced resonant frequency and efficiency.

Figure 5:
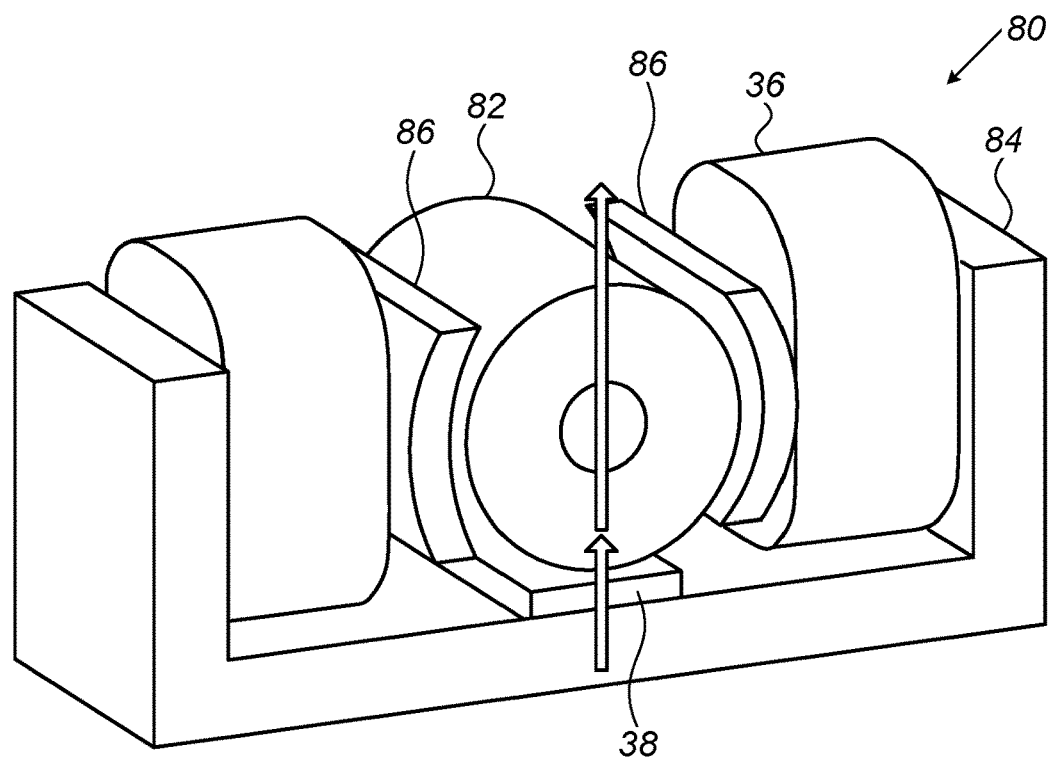

FIG. 5 is a schematic pictorial illustration of a magnetic scanning motor 80, in accordance with yet another embodiment of the invention. This design is similar to that in FIG. 4, with a rotor 82 and a stator 84. The stator in the present embodiment, however, includes only a single permanent (static) magnet 38, thus reducing size and weight still further. Pole pieces 86 of the core of stator 84 are enlarged and curve around stator 82 in order to strengthen the interaction between the AC magnetic field and the rotor.

Figure 6:
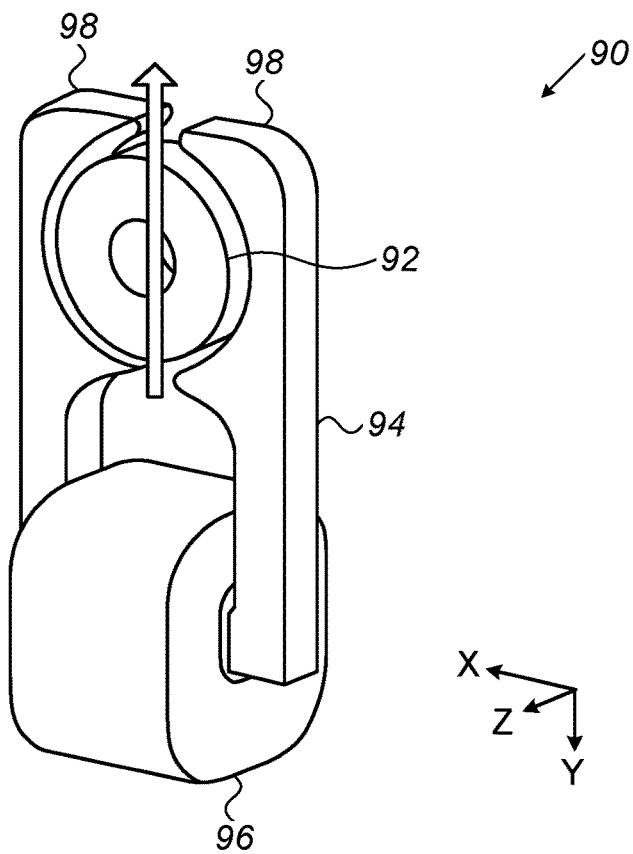
Figure 7:
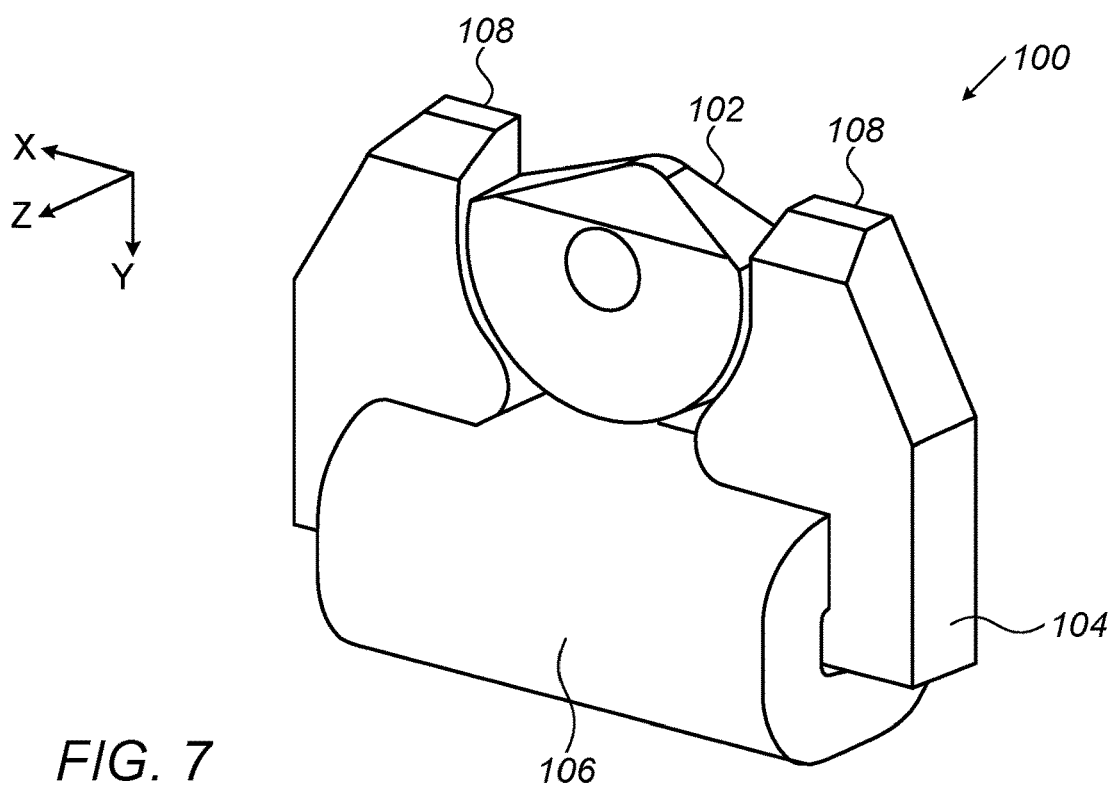

FIGS. 6 and 7 are schematic pictorial illustrations of magnetic scanning motors 90 and 100, respectively, in accordance with still other embodiments of the invention. In these embodiments, cores 94 and 104 are wound with a single coil 96 or 106 and do not necessarily include a permanent magnet. Rather, rotors 92 and 102 are shaped asymmetrically about their respective axes of rotation, and the equilibrium angle is determined by this asymmetrical shape of the rotor, as well as the corresponding shape of the stator. The rotor may have a small asymmetry, as in FIG. 6, or a more substantial asymmetry, as in FIG. 7.

Specifically, in the embodiments of FIGS. 6 and 7, the static magnetic field of the stator is generated not by fixed permanent magnets, as in the preceding embodiments, but rather by static magnetization that the permanent magnets of rotors 92 and 102 induce in ferromagnetic cores 94 and 104, respectively. Because of the asymmetry of the rotor and stator under reflection in the X-Z plane, the interaction between this induced magnetization and the permanent magnetic moment of the rotor gives rise to a torque on the rotor that varies with rotation angle. The asymmetrical shapes of rotors 92 and 102 and/or of pole pieces 98 and 108 of the respective stators are chosen so that over a range of angles about the equilibrium position shown in FIGS. 6 and 7 (in which the magnetic moment of the rotor points in the Y-direction, as indicated by the vertical arrows in the figures), the magnetic torque increases with angle and thus acts as a spring, driving the rotor back toward the equilibrium position. The shapes and sizes of the rotor and stator determine the stiffness of the spring and thus the resonant frequency of the scanning motor.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Scanning apparatus, comprising:
   a rotor comprising a permanent magnet, which is configured to rotate about an axis; and
   a stator, comprising:
      a magnetic core, which is configured to generate a static magnetic field in a vicinity of the rotor and defines an equilibrium angle of rotation of the rotor, at which the permanent magnet is aligned with the static magnetic field; and at least one coil, which is wound on the magnetic core so that when the coil is driven with an AC electrical current at a selected frequency, the stator generates a time-alternating magnetic field, which causes the rotor to oscillate on the axis at the selected frequency about the equilibrium angle.

2. The apparatus according to claim 1, wherein the rotor has a resonant frequency of oscillation that is determined by a strength of the static magnetic field, and wherein the apparatus comprises a drive circuit, which is coupled to drive the at least one coil at the resonant frequency.

3. The apparatus according to claim 1, wherein the magnetic core comprises one or more further permanent magnets, which are positioned so as to generate the static magnetic field.

4. The apparatus according to claim 3, wherein the permanent magnets of the rotor and magnetic core have magnetic moments that are aligned at the equilibrium angle of rotation.

5. The apparatus according to claim 3, wherein the one or more permanent magnets of the magnetic core are positioned along the equilibrium angle with respect to the rotor.

6. The apparatus according to claim 1, wherein the rotor has a shape that is asymmetrical about the axis, and wherein the equilibrium angle is determined by the asymmetrical shape of the rotor.

7. The apparatus according to claim 1, wherein the magnetic core comprises pole pieces on which the at least one coil is wound, wherein the pole pieces are disposed adjacent to the rotor on opposing sides of the equilibrium angle.

8. The apparatus according to claim 1, wherein the magnetic core comprises:

one or more pole pieces, on which the at least one coil is wound and which are disposed adjacent to the rotor; and a frame, which comprises a ferromagnetic material and surrounds the one or more pole pieces, the at least one coil, and the rotor.

9. The apparatus according to claim 1, and comprising:
a shaft, which is fixed to the rotor; and
a mirror, which is fixed to the shaft so that the mirror oscillates with the rotor.

10. The apparatus according to claim 9, and comprising a torsion spring, extending along the axis and having a first end that is attached to rotate with the shaft and a second end attached to a base of the apparatus.

11. A method for scanning, comprising:
mounting a rotor comprising a permanent magnet to rotate about an axis within a stator comprising a magnetic core, which generates a static magnetic field in a vicinity of the rotor and defines an equilibrium angle of rotation of the rotor, at which the permanent magnet is aligned with the static magnetic field; and driving at least one coil, which is wound on the magnetic core, with an AC electrical current at a selected frequency, whereby the stator generates a time-alternating magnetic field, which causes the rotor to oscillate on the axis at the selected frequency about the equilibrium angle.

12. The method according to claim 11, wherein the rotor has a resonant frequency of oscillation that is determined by a strength of the static magnetic field, and wherein the at least one coil is driven at the resonant frequency.

13. The method according to claim 11, wherein the magnetic core comprises one or more further permanent magnets, which are positioned so as to generate the static magnetic field.

14. The method according to claim 13, wherein the permanent magnets of the rotor and magnetic core have magnetic moments that are aligned at the equilibrium angle of rotation.

15. The method according to claim 13, wherein the one or more permanent magnets of the magnetic core are positioned along the equilibrium angle with respect to the rotor.

16. The method according to claim 11, wherein the rotor has a shape that is asymmetrical about the axis, and wherein the equilibrium angle is determined by the asymmetrical shape of the rotor.

17. The method according to claim 11, wherein the magnetic core comprises pole pieces on which the at least one coil is wound, wherein the pole pieces are disposed adjacent to the rotor on opposing sides of the equilibrium angle.

18. The method according to claim 11, wherein the magnetic core comprises:

one or more pole pieces, on which the at least one coil is wound and which are disposed adjacent to the rotor; and a frame, which comprises a ferromagnetic material and surrounds the one or more pole pieces, the at least one coil, and the rotor.

19. The method according to claim 1, and comprising:
fixing a shaft to the rotor; and
fixing a mirror to the shaft so that the mirror oscillates with the rotor.

20. The method according to claim 19, and comprising attaching a first end of a torsion spring, which extends along the axis, to rotate with the shaft and attaching a second end of the torsion spring to a base of the apparatus.

* * * * *